Dec. 5, 1950  S. A. DRMIC  2,532,359
PRUNING SHEARS
Filed Sept. 10, 1945
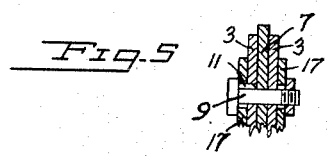
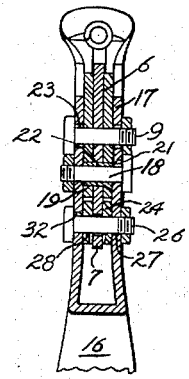
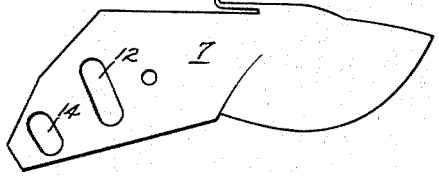
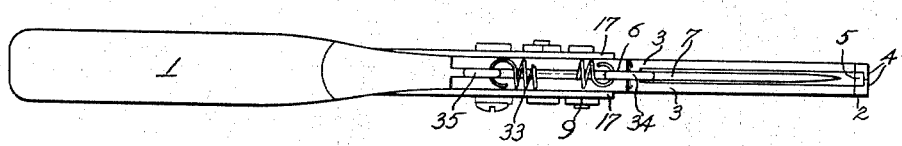
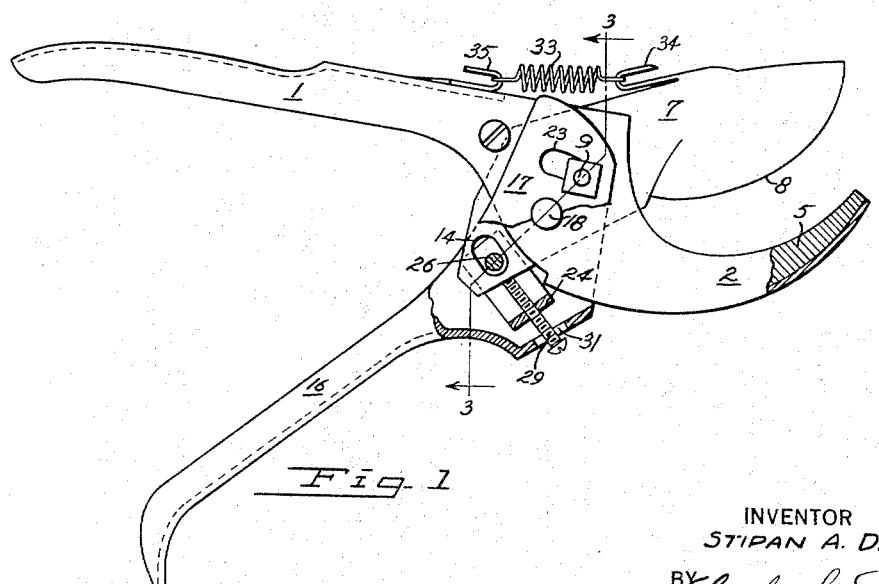
INVENTOR
STIPAN A. DRMIC
BY Charles S. Evans
HIS ATTORNEY Patented Dec. 5, 1950

2,532,359

UNITED STATES PATENT OFFICE 2,532,359

PRUNING SHEARS

Stipan A. Drmic, Watsonville, Calif.

Application September 10, 1945, Serial No. 615,364

3 Claims. (Cl. 30—258)

My invention relates to pruning shears and similar tools having jaws manually operated to cut or grip an object.

It is among the objects of my invention to provide a structure for pruning shears in which the cooperating cutters are so constructed and connected as to obtain great strength and an effective mechanical advantage.

Another object is a pruning shear construction in which provision is made for adjustably connecting a blade and blade actuating handle to compensate for wear, and to vary the leverage and degree of blade movement.

Another object is to provide a pivot bushing for preventing wear upon a main cutter part of a pair of pruning shears, and for permitting replacement when required to restore the shears to operative efficiency.

The invention possesses other valuable features, some of which with the foregoing will be set forth at length in the following description where that form of the invention which has been selected for illustration in the drawings accompanying and forming a part of the present specification is explained. In said drawings, one form of the invention is shown, but it is to be understood that it is not limited to that form, since the invention as set forth in the claims may be embodied in a plurality of forms.

In the drawings:

Figure 1 is a side elevation of a pair of pruning shears embodying my invention; parts being broken away, and parts being shown in section.

Figure 2 is a top view of the pruning shears shown in Figure 1.

Figure 3 is a transverse sectional view, the section being taken upon a plane indicated by the line 3—3 of Figure 1, and being viewed in the direction indicated by the arrows.

Figure 4 is a side elevational view of the cutter blade.

Figure 5 is an enlarged sectional detail showing the manner in which the blade pivot pin is keyed.

In terms of broad inclusion, the pruning shears of my invention comprises an integrally formed jaw and handle in which the handle and jaw portions are of channel-shaped cross-section, and are slotted adjacent their juncture to receive a cutting blade pivoted to the jaw in crossing relation thereto. A second handle is pivoted to the jaw at a point rearwardly spaced from the blade pivot; and a connection is provided, for imparting pressure from the second handle to the blade with a substantial mechanical advantage. The connection is adjustable for varying the point of engagement to compensate for wear of the blade, and for varying the mechanical advantage and the degree of relative movement of the shear blade and jaw. My invention also contemplates the provision of a hardened bushing to prevent wear of the main shear parts upon a connecting pivot pin; and to permit replacement of the bushings and/or pins for restoring the operative efficiency of the shears when the bearing areas become worn.

In terms of greater detail, the pruning shears of my invention comprise a handle 1 having a jaw 2 integrally formed therewith. Preferably the handle and jaw are shaped from sheet metal such as iron or mild steel bent to channel-shaped cross-section. The handle 1 is shaped with a relatively wide curved back and shallow channel. The jaw portion 2 is formed from a pair of extensions 3 projecting forwardly from the handle in spaced parallel relation. The extensions 3 are provided with flanges 4 upon their backs, the flanges being welded or otherwise joined to form a solid curved back for the jaw 2. A cutting block 5 of relatively soft metal such as copper or brass is fitted into the channel formed by the extensions 3 and flanges 4. The upper or cutting face of the jaw 2 is shaped with a concave curvature.

Between the handle 1 and jaw 2, the spaced extensions 3 are relatively wide, and are left unjoined along their corresponding upper and lower edges, thereby providing a slot 6 through which is mounted a cutter blade 7. A cutting edge 8 on the blade 7 is curved to conform to the jaw 2, and to seat against the block 5 along its entire length. The blade 7 is pivoted to the jaw 2 by means of a pivot pin 9 extending through matching openings in the blade and jaw. The pin 9 which may be in the nature of a machine bolt, is preferably provided with a key portion 11 engaging a corresponding notch in one of the jaw extensions 3 for holding the pin against rotation, while the blade 7 turns on the pivot pin. The blade 7 is made of tool steel and is appropriately tempered, and hence substantially all wear due to pivotal movement of the blade 7 and jaw 2 will be upon the pivot pin itself. When the pin 9 becomes so worn as to impair the operation of the shears, replacement of the pin only will restore the operative efficiency of the pivot bearing.

The blade member 7 extends rearwardly across the jaw extensions 3. Slots 12 and 14 are formed in the rearwardly extending portion of the blade at different distances from the pivot pin 9.

A blade actuating handle 16 is pivotally mounted upon the jaw forming extensions 3 in connection with the blade 7. The handle 16 is of channel-shaped cross-section, and is provided with spaced parallel extensions 17 arranged to fit over the outer sides of the jaw extensions 3. The handle 16 is pivoted to the jaw extensions 3 by means of a pivot pin 18 which extends through openings 19 in the extensions 3 and the slot 12 of the blade. The pin 18 is provided with a key portion 21 seating in a corresponding keyway in one of the extensions 17 for preventing rotation of the handle upon the pin 18. A bushing 22 of steel or other wear resistant material is keyed into the opening 19 of each extension 3. The pin 18 is turned within the bushing 22 as the handle 16 is operated, and substantially all wear is upon the pin 18. The blade pivot pin 9 extends through arcuate slots 23 in the extensions 17.

The handle 16 is connected to the blade 7 by means of a yoke 24 and pivot pin 26 extending through registering openings 27 and 28 in the extensions 17 and yoke 24 respectively, and through the slot 14 of the blade. A screw 29 is threaded through the back of the yoke 24. The inner end of the screw 29 engages the adjacent edge of the rearwardly extending portion of the blade 7. The outer or head end of the screw extends outwardly through an opening 31 in the back of the handle 16. The pivot pin 26 has a key portion 32 which causes the pin to move with the handle 16 so that the handle will not be exposed to wear on the pivot pin.

A spring 33 is provided for normally moving the blade 7 and jaw 2 apart. Preferably the spring 33 is connected at opposite ends to hooks 34 and 35 upon the back of the blade 7 and jaw handle 1.

As the handles 1 and 16 are pressed together, the handle 16 turns about the pivot 18. Pressure is applied through the yoke 24 to the rearwardly extending end of the blade 7 for moving the blade about the pivot 9. The handle 16 and rearward extension of the blade 7 turn about the spaced pivots 9 and 18 to obtain a compound leverage which affords an effective mechanical advantage in applying cutting pressure to the blade 7.

The material to be cut is held in the curve of the jaw 2. The width of the jaw, with the block 5 fitted between its sides, provides a stable support against which the material is held while the blade cuts through the material. The tempered steel blade is moved against the soft block 5 to produce a clean cut without damaging the blade.

The adjusting screw 29 may be set to permit pressure to be applied by the pin 26 against the end of the slot 14; or it may be set so that the screw itself transmits pressure to the edge of the blade as shown in Figure 1 of the drawings. The screw 29 is positioned to engage the blade 7 at a point such that the distance between the point of engagement and the pivot 9 is greater than the distance between the pin 26 and the pivot 9, thereby permitting pressure to be applied by the screw 29 with a somewhat greater mechanical advantage. This adjustment effects the degree to which the blade and jaw are moved apart in open position; and also affords means for compensating for wear on the blade whereby the blade may be moved to cutting engagement with the block 5 notwithstanding substantial wear due to repeated sharpening of the blade.

I claim:

1. Pruning shears comprising an integrally formed handle and jaw having a blade receiving slot, a blade extending through the slot and pivoted to the jaw, the blade having a pair of slots rearwardly spaced from the pivot axis of the blade, a blade actuating handle provided with arms engaging opposite sides of the jaw, a pin pivotally securing the blade actuating handle to the jaw and extending through one of the blade slots, and means adjustably connecting the blade handle to the blade in association with the second slot.

2. Pruning shears comprising an integrally formed handle and jaw having a blade receiving slot, a blade extending through the slot and pivoted to the jaw, the blade having a pair of slots rearwardly spaced from the pivot axis of the blade, a blade actuating handle provided with arms engaging opposite sides of the jaw, a pin pivotally securing the blade actuating handle to the jaw and extending through one of the blade slots, a pressure applying pin carried by the blade handle and extending through the second blade slot, a yoke mounted upon the pressure applying pin, and a screw threaded through the back of the yoke and engaging the blade for adjusting the operative relationship of the blade handle and blade.

3. Pruning shears comprising an integrally formed handle and jaw having a slotted blade mounting portion between the handle and jaw, a blade extending through the mounting portion, a blade pivot pin keyed to the mounting portion and pivotally engaging the blade, a blade handle having extensions positioned upon opposite sides of the blade mounting portion, a handle pivot pin keyed to the extensions and extending through the mounting portion and a slot in the blade, a bushing inset in the mounting portion and keyed thereto to receive the handle pivot pin, a yoke pivoted to the blade handle in rearwardly spaced relation to the handle pivot, and a screw threaded into the yoke in engagement with the rearward end of the blade for imparting actuating pressure to the blade.

STIPAN A. DRMIC.

REFERENCES CITED

The following references are of record in the file of this patent:

UNITED STATES PATENTS

| Number | Name | Date |
|---|---|---|
| 474,284 | Berridge | May 3, 1892 |
| 530,221 | Effinger | Dec. 4, 1894 |
| 1,741,803 | Zeidler | Dec. 31, 1929 |
| 1,969,129 | Harz | Aug. 7, 1934 |
| 2,227,531 | Cantrell | Jan. 7, 1941 |
| 2,384,822 | Drmic | Sept. 18, 1945 |
| 2,385,835 | Neal | Oct. 2, 1945 |

FOREIGN PATENTS

| Number | Country | Date |
|---|---|---|
| 11,632 | Switzerland | Mar. 21, 1896 |
| 111,691 | Australia | Oct. 3, 1940 |
| 117,841 | Australia | June 4, 1942 |